United States Patent [19]

Pomerantz et al.

[11] 4,206,552

[45] Jun. 10, 1980

[54] MEANS AND METHOD FOR CONTROLLING THE OPERATION OF A DRYING APPARATUS

[75] Inventors: Daniel I. Pomerantz, Lexington; Walter R. Spofford, Jr., Bedford; Sanders Goldstein, Cambridge, all of Mass.

[73] Assignee: Mallory Components Group Emhart Industries, Inc., Indianapolis, Ind.

[21] Appl. No.: 900,921

[22] Filed: Apr. 28, 1978

[51] Int. Cl.² ............................................. F26B 21/06
[52] U.S. Cl. .......................................... 34/23; 34/43; 34/44; 34/48; 34/54; 34/55; 219/497
[58] Field of Search ...................... 68/12 R; 34/43, 44, 34/45, 46, 48, 53, 55, 133, 23; 219/497, 501; 307/141, 141.4, 293

[56] References Cited

U.S. PATENT DOCUMENTS

| | | | |
|---|---|---|---|
| 3,333,345 | 8/1967 | Miller | 34/45 |
| 3,401,464 | 9/1968 | Fogt et al. | 34/48 |
| 3,491,458 | 1/1970 | Elders et al. | 34/45 |
| 3,526,968 | 9/1970 | Triplett | 34/48 |
| 3,662,186 | 5/1972 | Karklys | 34/45 |
| 3,762,064 | 10/1973 | Offutt | 34/45 |
| 3,782,001 | 1/1974 | Cotton | 34/53 |
| 3,809,924 | 5/1974 | Grunow et al. | 307/125 |
| 3,818,604 | 6/1974 | Offutt et al. | 34/45 |
| 3,822,482 | 7/1974 | Cotton | 34/45 |
| 4,112,589 | 9/1978 | Palfrey et al. | 34/48 |

Primary Examiner—Larry I. Schwartz
Attorney, Agent, or Firm—Hoffmann & Meyer

[57] ABSTRACT

Disclosed is a control system for controlling the operation of an appliance and the like which is particularly adaptable for controlling at least one operation variable of an apparatus for drying articles such as a clothes dryer, washer-dryer or similar type of appliance. The drying apparatus is capable of accurately drying any number of articles to a desired degree of dryness irrespective of time by sensing a plurality of temperatures and deriving a final temperature difference for each load of articles indicative of the degree of dryness desired. Furthermore, the control system provides the ability to optionally control the drying apparatus by timing its operation, to control the temperature of the air used for drying, to reduce the temperature of the air used for drying before the completion of an operation cycle so as to avoid setting wrinkles, and to determine and indicate when excessive lint has accumulated on the lint filter. The control system includes a control element for processing a plurality of signals representing programmable values of operation variables and representing varying conditions associated with the operation of the appliance in accordance with a control strategy, means for addressing the control element with such signals, and means for activating and deactivating the appliance in accordance with the control strategy.

34 Claims, 4 Drawing Figures

MEANS AND METHOD FOR CONTROLLING THE OPERATION OF A DRYING APPARATUS

BACKGROUND OF THE INVENTION

1. Field of the Invention

The present invention relates to systems for controlling the operation of an appliance and the like and is more particularly disclosed as it would be adapted to control a drying apparatus such as a clothes dryer, washer-dryer, etc.

Generally speaking, the control system of the present invention includes a control element for processing a plurality of signals representing programmable values of operation variables and representing varying conditions associated with the operation of an appliance in accordance with a control strategy, first means for addressing the control element with signals representing desired values of the operation variables, second means for addressing the control element with the signals representing varying conditions associated with the appliance operation, the second means for addressing the control element including at least two sensors for sensing the varying conditions, and means responsive to the control element for activating and deactivating at least one machine function of the appliance in accordance with the control strategy.

Furthermore, a method of controlling the operation of the appliance includes a step of deriving a final value difference between varying conditions indicative of desired results. This final value difference is a function of a maximum value difference between varying conditions and a predetermined result to be achieved by operation of the appliance.

2. Description of the Prior Art

In a typical drying apparatus such as a clothes dryer, it is generally desirable to be able to at least control the dryness of the articles being dried at the conclusion of an operation cycle. Furthermore, it may be desirable to control the temperature of the air used during the drying operation, the temperature of the air after the articles have been dried to a desired degree of dryness, or the operation of the apparatus in response to the existence of a condition which if left undetected could cause damage to the apparatus or result in its inefficient operation.

Various control systems have been devised to control at least one of the aforementioned operation variables of a drying apparatus. In general, these conventional control systems have been directed to the control of the dryness of the articles being dried at the conclusion of an operation cycle of the drying apparatus (See U.S. Pat. Nos. 3,333,345; 3,809,924; and 3,822,482) and have typically employed sensors for sensing the moisture content of the articles. Accordingly, the conventional control systems have been limited in the number of operation variables they are capable of controlling without the addition of sensors and associated control circuitry. Furthermore, these conventional control systems are incapable of economically providing the user of the drying apparatus with the option of either timing an operational cycle of the apparatus or controlling it independent of time by dryness sensing.

In U.S. Pat. No. 3,333,345 there is described a dryness control system which includes a single sensor that controls the operation of the dryer in accordance with the dampness of the articles being processed. This control system includes a probe secured at the center of a rear wall of a tumbling compartment having an interrupted current path therethrough arranged so that wet articles being tumbled occasionally will complete the interrupted current path and thereby condition the control system for terminating the drying. Although this method of dryness control is substantially accurate when a large load of articles is being processed, one of its major disadvantages is that when a small load of articles is being processed the articles may not contact the probe with sufficient frequency for the system to accurately control the dryness of the articles.

In U.S. Pat. No. 3,809,924 there is described a system for controlling the drying process of articles which again is dependent upon the moisture content of the articles being dried. The invention described therein is based on the observation that completely dry articles which are moved in a tumbling dryer become electrostatically charged. Accordingly, the electrostatic charge occurring in the articles being processed is sensed and an electrical signal indicative of the field intensity of the electrostatic charge is used to control the drying operation. A disadvantage of this system is that it lacks the ability to control a plurality of degrees of dryness. An electrostatic charge would not occur on articles until they are substantially dry; accordingly, this system would not allow the user to only partially dry the articles. Where many dryness control systems are incapable of drying to a moisture content of zero (0) percent, this control system is incapable of drying to a moisture content of any value other than substantially zero (0) percent.

In U.S. Pat. No. 3,822,482 there is described a system for controlling the drying process of articles which again is dependent upon the moisture content of the articles. In the invention described therein two conductive electrodes are bridged by the moisture laden articles as they are tumbled in a compartment. As in the case of U.S. Pat. No. 3,333,345, a disadvantage of this system is its inability to accurately control the dryness of a small number of articles. Furthermore, by utilizing the moisture content of articles to determine their dryness the control system is limited to dryness sensing unless additional sensors and associated circuitry are incorporated thereby adding to the cost of the control system.

The means and method for controlling the operation of a drying apparatus described hereinafter overcome the disadvantages of the prior art control systems described above by sensing the temperature of the air being used to dry the articles as it enters the compartment and the temperature of the same air as it leaves the compartment and deriving, as a function of the maximum difference between such temperatures and a preselected dryness level, a final temperature difference which is indicative of the selected dryness level. Since temperatures are being sensed to control the dryness operation of the apparatus the same means can be utilized to inexpensively control other operation variables of the apparatus such as the temperature of the air used for drying, the temperature of the air within the compartment after the desired level of dryness has been achieved in order to avoid setting wrinkles, and an excessively high compartment temperature indicative of a loaded or clogged lint filter.

SUMMARY OF THE INVENTION

In accordance with the present invention in its broadest concept, there is provided a control system for controlling the operation of an appliance and the like which among other things gives a user of an appliance such as a clothes dryer an option of time dependent or time independent operation of the appliance and includes a control element for processing a plurality of signals in accordance with a control strategy wherein the signals represent programmable values of operation variables and varying conditions associated with the operation of the appliance, two means for addressing the control element with the signals wherein one of the means includes at least two sensors and means responsive to the control element for activating and deactivating at least one machine function of the appliance in accordance with the control strategy. Furthermore, because of the unique method employed by the control system it may be used to inexpensively control other operation variables of an appliance such as a clothes dryer or other drying apparatus.

Accordingly, it is a feature of the present invention to provide a control system for controlling the operation of an appliance and the like which gives the user of the appliance an option of time dependent or time independent operation of the appliance.

It is a further feature of the present invention to provide a method of controlling the operation of an appliance and the like such as a clothes dryer which includes the capability of economically sensing and controlling a plurality of operation variables required for proper functioning of the clothes dryer.

It is yet another feature of the present invention to provide a means and method of controlling the operation of a drying apparatus of the type which includes a compartment within which at least one article may be dried, at least one machine function for providing a stream of heated air to the compartment, and means for venting a stream of moisture laden air from the compartment during the drying operation of the apparatus by sensing a plurality of temperatures of the heated air as it enters the compartment, sensing a plurality of temperatures of the moisture laden air as it leaves the compartment, determining the maximum temperature difference between a temperature of the heated air and a simultaneous temperature of the moisture laden air, deriving as a function of the maximum temperature difference and a predetermined dryness level for said article a final temperature difference between the temperatures indicative of the predetermined dryness level, and deactivating the machine function when a temperature difference between the temperatures substantially equals the final temperature difference.

It is still a further feature of the present invention to provide a means and method of controlling the operation of a drying apparatus of the type heretofore described wherein the air temperature within the compartment is controlled by sensing the temperatures of the heated air as it enters the compartment and/or sensing the temperatures of the moisture laden air as it leaves the compartment.

It is still yet another feature of the present invention to provide a means and method of controlling the operation of a drying apparatus of the type heretofore described wherein the apparatus is protected against damage and operation inefficiency by sensing the temperatures of the heated air as it enters the compartment.

Other features and advantages of the present invention will be apparent from the following detailed description of a preferred embodiment thereof, which description should be considered in conjunction with the accompanying drawings in which:

DESCRIPTION OF THE PREFERRED EMBODIMENT

Figure 1:
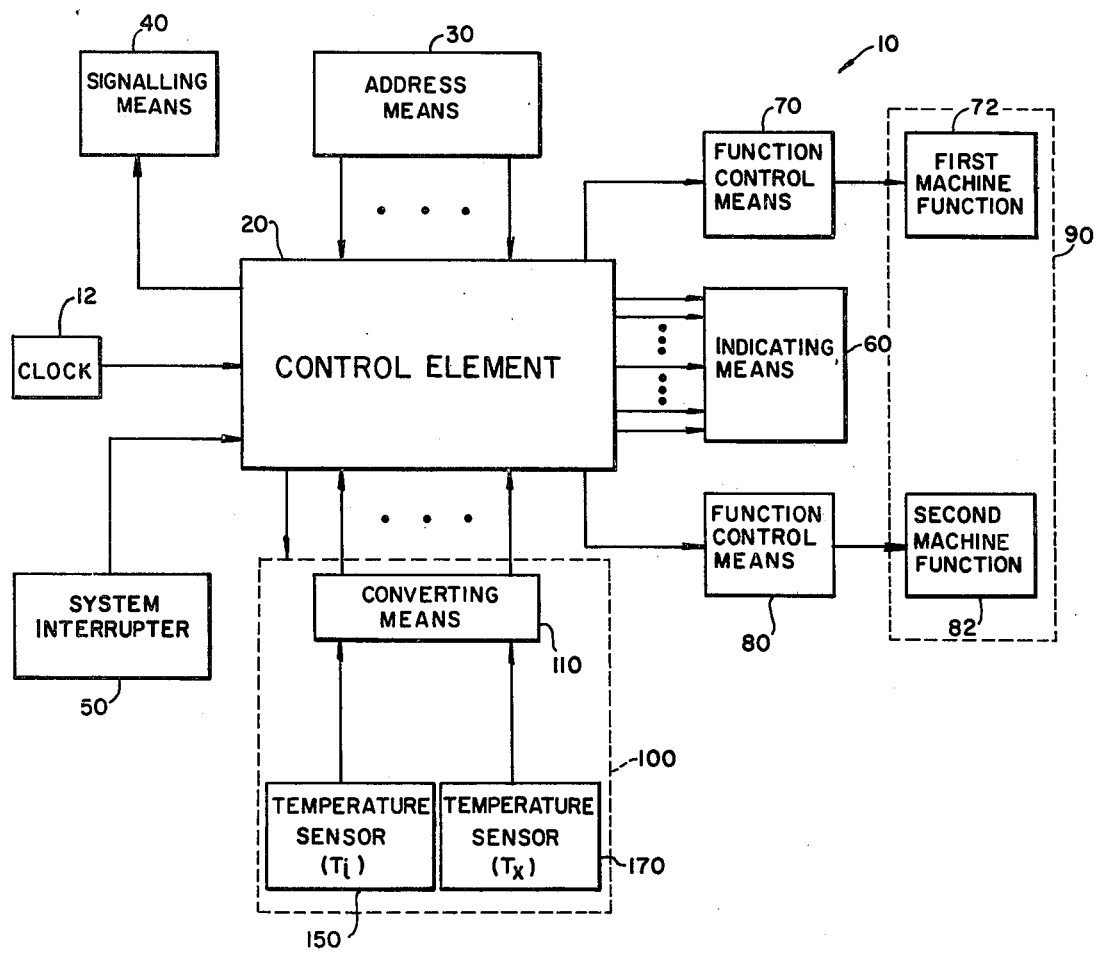
FIG. 1 is a schematic block diagram of a control system constructed in accordance with the present invention.

Illustrated in FIG. 1 is a schematic block diagram of our invention which for purposes of this disclosure will be described with respect to its adaptation to controlling the operation of a drying apparatus or appliance such as a clothes dryer or dryer-washer combination. However, it will be understood by those skilled in the art after reading the description of our invention provided hereinafter, that it and/or the method associated with its functions may be adapted to control other appliances and the like wherein a final value difference between two similar operation conditions having dissimilar values may be derived as a function of a maximum value difference between such conditions and a desired result and the final value difference is indicative of the desired result to be achieved by the appliance.

Referring now to FIG. 1, a control system 10 for controlling the operation of a drying apparatus 90 of the type which includes a compartment (not shown) within which at least one article may be dried, a machine function 72 for rotating the compartment which typically includes a conventional inductive motor operating at 110 volts AC, a machine function 82 for providing a stream of heated air to the compartment which typically includes a heater operating at 220 volts AC, a blower, and means for venting (not shown) a stream of moisture laden air from the compartment during the drying operation of the apparatus 90.

Continuing to refer to FIG. 1, control system 10 of our invention includes a control element 20 for processing a plurality of signals in accordance with a control strategy (See FIG. 3), the signals representing programmable values of operation variables and varying conditions associated with the operation of the apparatus 90, first means 30 for addressing the control element 20 with the signals representing programmable values of the operation variables, second means 100 responsive to the control element 20 for addressing the control element 20 with the signals representing the varying conditions, and means 70 and 80 responsive to the control element 20 for activating and deactivating the machine functions 72 and 82 respectively in accordance with the control strategy. A clock 12 which serves as a source of continuous equally spaced pulses is coupled to the control element 20 so that control element 20 may provide fixed time intervals as part of its control function. Furthermore, control system 10 may include indicating means 60 responsive to the control element 20 for indicating various operation modes of the apparatus 90, signalling means 40 responsive to the control element 20 for signalling various events in the operation of the apparatus 90, and a system interrupter 50 coupled to the control element 20 for interrupting the operation of the apparatus 90 at a desired point in its operation cycle.

As shown in FIG. 1, means 100 for addressing control element 20 with signals representing varying conditions associated with the operation of the apparatus 90 includes two temperature sensors 150 and 170 and means 110 for converting the electrical analog of the temperatures $T_i$ and $T_x$ sensed respectively by sensors 150 and 170 to digital signals compatible with the control element 20.

As indicated, temperature sensor 150 senses temperatures $T_i$ which in the preferred embodiment are temperatures of the stream of heated air as it enters the compartment of the drying apparatus 90 and temperature sensor 170 senses temperatures $T_x$ which in the preferred embodiment are temperatures of the moisture laden air as it is vented from the compartment during the drying operation of apparatus 90. Furthermore, in the preferred embodiment of control system 10 converting means 110 includes an analog to digital converter circuit which converts the electrical analog of the temperatures $T_i$ and $T_x$ being sensed by sensors 150 and 170 respectively to digital signals representative of the sensed temperatures $T_i$ and $T_x$. These digital signals are further processed by control element 20 to obtain the desired controlled operation of apparatus 90 as will be discussed hereinbelow. While in our preferred embodiment of control system 10 converting means 110 is an analog to digital converter circuit it is not thereby intended that converting means 110 be so limited since in the adaptation of control system 10 to appliances other than drying appliances converting means 110 may include other circuitry required to express sensed conditions when addressing the control element 20.

In general, clock 12, control element 20, system interrupter 50, signalling means 40, address means 30, indicating means 60, and function control means 70 and 80 of control system 10 may be any conventional component or circuit of the type hereinafter described which is suitable for performing the function of such elements. For example, clock 12 may comprise an oscillator or multivibrator circuit or could consist simply of the AC power line and/or circuits that rectify and/or shape the AC power line. It is desirable that the clock 12 have a fixed period and therefore it has been found preferable to provide a clock wherein the pulses provided are derived from the 60 HZ AC power line. Control element 20 may comprise any type of a processing unit such as a conventional microprocessor or microcomputer. In the preferred embodiment of control system 10, control element 20 may be a low cost 4 bit microcomputer of the type manufactured by Texas Instruments, Inc. Dallas, Tex. and identified as the TMS-1100N. System interrupter 50 may comprise any one of numerous means available in the art for interrupting an electrical signal such as an electrical or mechanical switch. In our preferred embodiment a switching mechanism located in the door (not shown) of drying apparatus 90 interrupts the operation of the apparatus 90 when the door is opened. Signalling means 40 and indicating means 60 may each comprise any device capable of providing an audible or visual signal to the user of the apparatus 90. Again in our preferred embodiment, signalling means 40 is a SONALERT® alarm device of the type manufactured by P. R. Mallory & Co. Inc., Indianapolis, Ind. and indicating means 60 includes a plurality of light emitting diodes. The term SONALERT® is a registered trademark of P. R. Mallory & Co. Inc., Indianapolis, Ind. The control element 20 is addressed by the user of the apparatus 90 by address means 30 which employs means well known in the art for this function such as pushbuttons or touch controls with associated implemental circuitry. Function control means 70 and 80 will typically include a bidirectional switching device such as a mechanical relay or triac and associated circuitry to limit current and/or voltage surges during activation of the machine function being controlled. Numerous combinations of circuit components exist in the prior art for accomplishing the above objective. In accordance with the above discussion of exemplary circuits and components for clock 12, control element 20, system interrupter 50, signalling means 40, address means 30, indicating means 60 and function control means 70 and 80, it is not essential to our invention that any particular circuit or component be utilized as long as whatever circuit or component is used functions as indicated.

Figure 2:
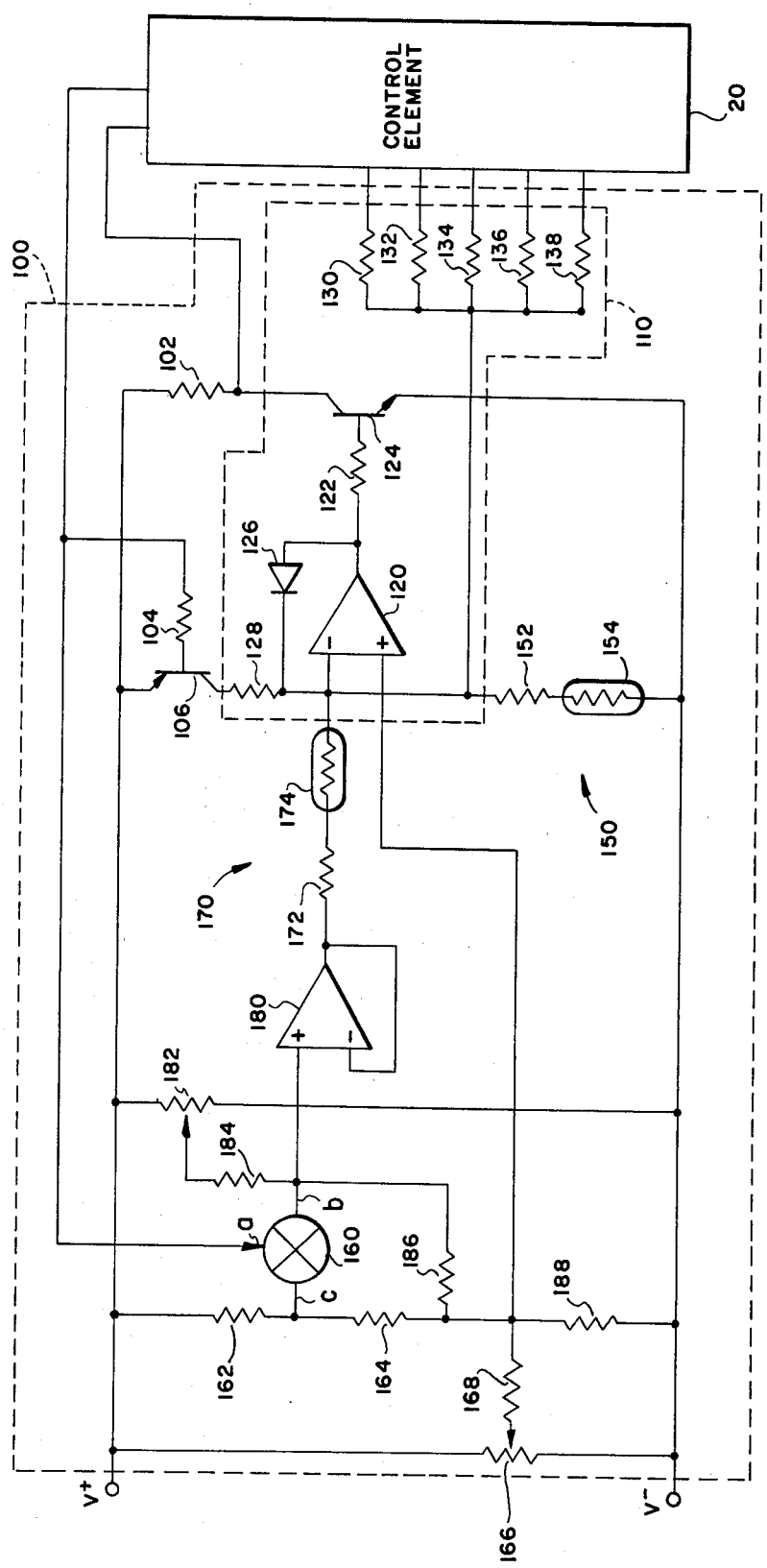
FIG. 2 is a complete schematic diagram of a preferred embodiment of a portion of the control system shown in FIG. 1.

Referring now to FIG. 2 there is shown a complete schematic diagram using conventional symbols for known elements of a preferred embodiment of address means 100 of the control system 10 shown in FIG. 1. It should again be understood that the embodiment of address means 100 shown in FIG. 2 is the embodiment which would be preferred in the adaptation of control system 10 to controlling a drying apparatus and therefore is described hereinafter in such context. However, in practicing the method of our invention to control various other appliances, alternative address means 100 may be devised to make our control system 10 adaptable to control various operations of such appliances.

In address means 100, temperature sensors 150 and 170 may include conventional semiconductor devices such as thermistors, diodes or transistors as opposed to conventional mechanical devices such as bimetallic switches. Typically, bimetallic switches are relatively expensive devices and switch only at a predetermined temperature; whereas, semiconductor devices are relatively inexpensive and provide a continuous electrical analog of the temperatures being sensed. In the preferred embodiment of address means 100 we have chosen to use thermistors 154 and 174 as sensing devices in temperature sensors 150 and 170 respectively. Thermistor 154 is situated in the input stream of heated air and senses temperatures $T_i$ and thermistor 174 is situated in the vented stream of moisture laden air and senses temperatures $T_x$. The characteristics of thermistors 154 and 174 are linearized respectively by resistors 152 and 172 electrically coupled in series therewith. Typically, if a constant voltage is maintained across these series combinations of thermistors and resistors, the current through each resistor/thermistor combination is linearly proportional to the temperatures $T_i$ and $T_x$ sensed over a limited range of temperatures. The constant reference voltages are derived from the voltage divider network comprising the series combination of resistors 162, 164, and 188.

As illustrated in FIG. 2, potentiometers 166 and 182 are electrically coupled across the positive V+ and negative V sides of a DC power supply. Potentiometer 166 has its wiper electrically coupled through a resistor 168 to the junction coupling resistors 164 and 188 and to the positive (+) input of a comparator 120 (which forms a part of converting means 110.) Potentiometer 182 has its wiper electrically coupled through a resistor 184 to the positive (+) input of operational amplifier (op amp.) 180 and a terminal b of a bilateral semiconductor switching device 160 which in the preferred embodiment is a CMOS transmission gate of the 4016 type manufactured by RCA. Switching device 160 has another terminal c electrically coupled to the junction coupling resistors 162 and 164 and a digital input a electrically coupled to control element 20 whereby switching device 160 is responsive to an output of control element 20. As further shown, a resistor 186 has one side electrically coupled to the junction coupling resistors 164 and 188 and another side electrically coupled to the positive (+) input of op amp. 180. The negative (−) input of op amp. 180 is electrically coupled to temperature sensor 170 and more particularly to one side of resistor 172 and the output of op amp. 180. Both temperature sensors 150 and 170 are electrically coupled to the negative (−) input of comparator 120 with one side of thermistor 174 and one side of resistor 152 of sensors 170 and 150 respectively electrically coupled thereto.

Switching device 160 is capable of controlling or switching analog signals in response to digital input signals. For example, when a logical one (1) signal is applied to the digital input a of switching device 160, the device 160 closes thereby transmitting an analog signal between terminals b and c. As long as a logical zero (0) signal is applied to the digital input a the switching device 160 remains open. Accordingly, the digital input a of switching device 160 controls a bilateral signal transmission path between terminals b and c.

Continuing to refer to FIG. 2, we have previously indicated that comparator 120 forms a part of converting means 110 and described how its negative (−) input is electrically coupled to each temperature sensor 150 and 170. Further, included within converting means 110 are five (5) resistors 130, 132, 134, 136, and 138 each of which are individually electrically coupled to control element 20 and electrically coupled in parallel to one side of resistor 152 of temperature sensor 150 and to the negative (−) input of comparator 120. Each of these five (5) resistors 130, 132, 134, 136 and 138 comprises a bit weighing element of a five (5) bit analog to digital converter (converting means 110) the operation of which will be described later. The negative (−) input of comparator 120 is also electrically coupled to the output of comparator 120 through a diode 126 and through a resistor 128 to the collector of a bipolar semiconductor switching device 106 which in the preferred embodiment is a PNP transistor. The emitter of transistor 106 is electrically coupled to the positive side V+ of the DC power supply and the base is electrically coupled through a resistor 104 to the same output of control element 20 as the digital input a of switching device 160. As further shown in FIG. 2, the output of comparator 120 is electrically coupled through a resistor 122 to the base of another bipolar semiconductor switching device 124 which in the preferred embodiment is an NPN transistor. The emitter of transistor 124 is electrically coupled to the negative side V− of the DC power supply and the collector is electrically coupled through a resistor 102 to the positive side V+ of the DC power supply. In the preferred embodiment of address means 100, the collector of transistor 124 is further electrically coupled to an input of control element 20.

Having described a preferred embodiment of our control system 10, its operation will now be described in relation to controlling a drying apparatus of the type previously indicated. The theory of operation hereinafter described is that which is at the present believed properly applicable to the embodiment of our control system 10 illustrated in FIGS. 1 and 2, but is not intended to be limiting in nature.

Generally, in a drying apparatus such as a clothes dryer, it is desirable to control operation variables according to the type of fabric being dried. For example, it is desirable to control the temperature of the air used for drying, the dryness of the clothes at the end of a drying cycle, the temperature within the drying compartment after the completion of a drying cycle, and the operation of the dryer in response to a clogged lint filter. It may further be desirable to provide a control system which allows the user to control the drying cycle of the clothes dryer by either sensing dryness (time independent) or by timing the cycle while also having the capability to control the other operation variables enumerated above. Accordingly, it is an objective of our invention to provide a control system having the capability of economically controlling each of these operation variables of a clothes dryer which also allows the user of the dryer to program the control system for the type of operation desired, e.g. air temperature and dryness, and for any size load of clothes desired to be dried.

Figure 4:
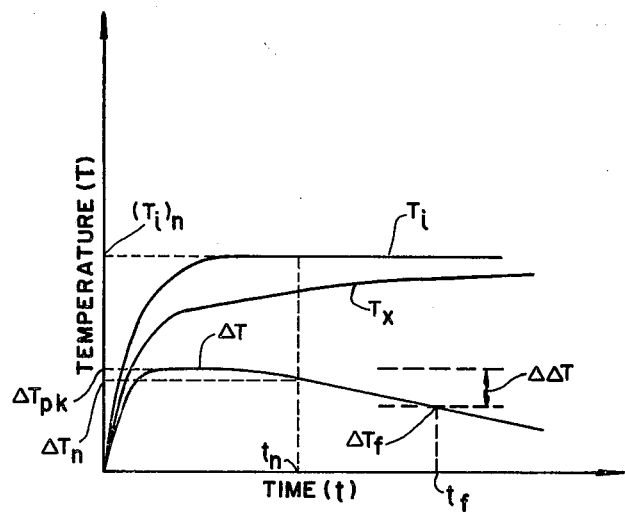
FIG. 4 is a graphical representation of various temperatures and temperature differences being sensed and determined by the control system shown in FIG. 1 in accordance with the control strategy shown in FIG. 3.
Figure 3:
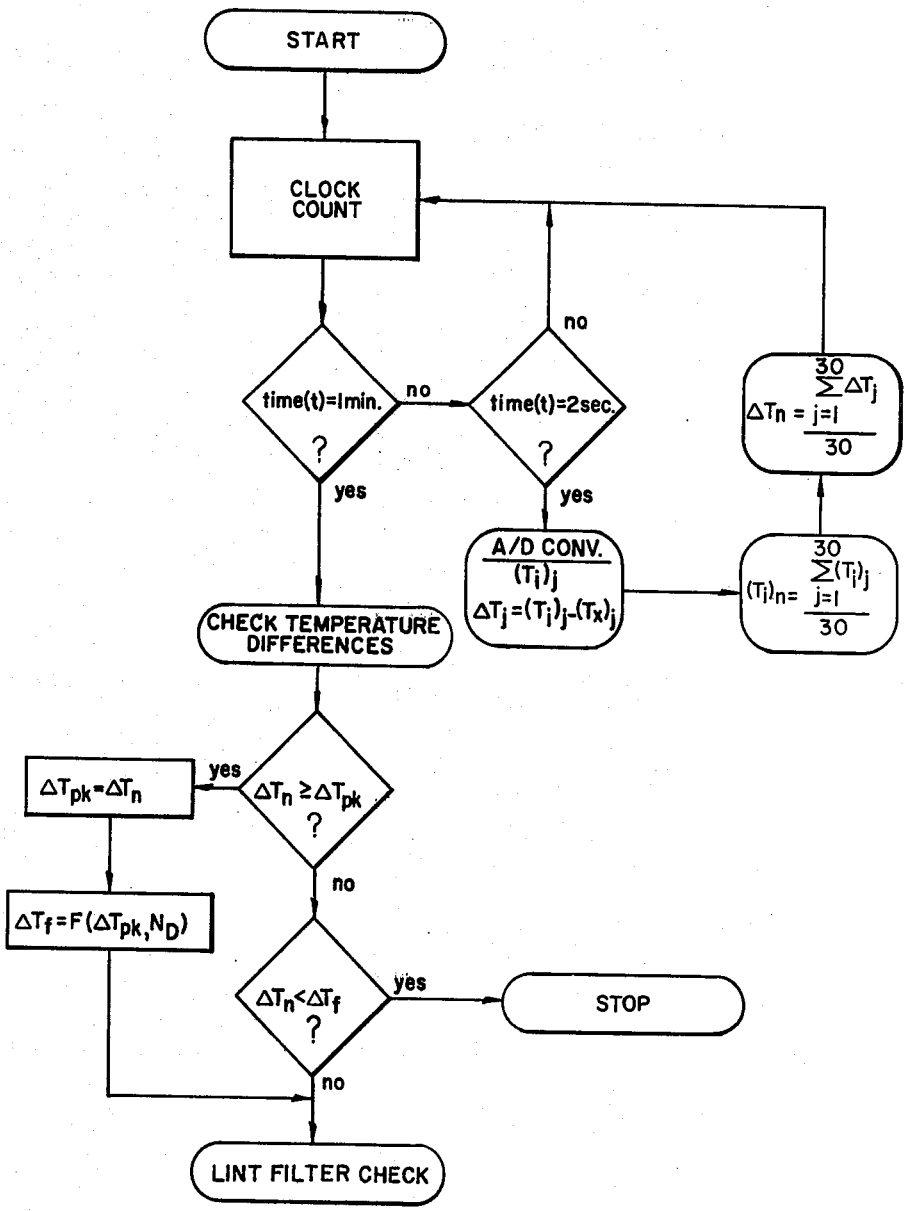
FIG. 3 is a flow diagram charting the functions of the control system shown in FIG. 1.

Referring to FIGS. 1, 2, 3 and 4 and in particular to FIGS. 3 and 4, the method by which our control system 10 operates may be described as follows. A feature of our invention is the use of temperature sensors 150 and 170 to measure and control temperatures $T_i$ (temperature of heated air entering the drying compartment) and $T_x$ (temperature of the moisture laden air leaving the drying compartment.) We have determined that the length of time required to achieve a particular dryness level for a load of clothing is directly related to the temperature difference $\Delta T$ between temperatures $T_i$ and $T_x$ (i.e. $\Delta T = T_i - T_x$). Referring to FIG. 4, there is shown a graphical relationship of temperatures $T_i$ and $T_x$ and the difference $\Delta T$ therebetween for time periods t. As can be seen, the temperature difference $\Delta T$ increases to a plateau as the clothes are drying and then drops. The drop in the temperature difference $\Delta T$ is due to the fact that the cooling effect on the temperature $T_x$ due to moisture content is reduced as the clothes become drier. Accordingly, the temperature difference $\Delta T$ between the input and output air is reduced. Obviously, the temperature difference $\Delta T$ at its plateau varies considerably with different sized loads. Furthermore, the size of the load affects the amount of change $(\Delta \Delta T)$ in the temperature difference from the maximum temperature difference $\Delta T_{pk}$ required for the clothes to reach a desired predetermined level of dryness. Accordingly, another feature of our invention is to provide a control system wherein the change in the temperature difference $\Delta \Delta T$ required for a desired predetermined level of dryness is adjusted in accordance with the size of the load whereby regardless of the size of the load, the same desired predetermined dryness level may be achieved by the dryer.

In operation, the user of the clothes dryer programs the control system 10 by entering the desired program inputs via first address means 30. Control element 20 has previously been internally programmed to operate in two predetermined modes i.e. the AUTO DRY mode or the TIME mode. Accordingly, the user may select either of these modes of operation, the dryness level desired (AUTO DRY mode), the time desired (TIME mode), the temperature of the drying air desired (AUTO DRY or TIME mode), the use of the signalling means, and/or the prevention of wrinkling. As illustrated in FIG. 1, control element 20 is addressed by these various user programmed values for operation variables of the dryer and in response to control element 20 machine functions 72 and 82 are initiated by function control means 70 and 80 respectively when the dryer is started by the user. Indicating means 60 will indicate which of the desired values for the above identified operation variables have been selected by the user, that the dryer is operating, and whether the lint filter is clogged. As previously discussed, timing for control system 10 is derived from clock 12.

Referring to FIGS. 2 and 3, second address means 100 comprises a means for sensing temperatures $T_i$ and $T_x$ and for converting the analog electrical signals representing such temperatures to digital signals suitable for interpretation by control element 20. In the preferred embodiment of second address means 100 two separate analog to digital conversions are accomplished to obtain two groups of temperature data. First, with a logical zero (0) signal provided at the digital input a of switching device 160 by control element 20 temperatures $T_i$ are sensed by sensor 150 and converted to digital signals by converting means 110. Since switching device 160 is open, the voltage at the positive (+) inputs of comparator 120 and op amp. 180 are identical. In effect, op amp. 180 is a unity gain buffer amplifier and therefore the voltage at its output is equal to the voltage at its positive (+) input. Accordingly, when the negative (−) input of voltage comparator 120 is at the same voltage as the positive (+) input of op amp. 180 there will be zero (0) volts (and therefore zero (0) current) across the series combination of resistor 172 and thermistor 174 (sensor 170.) Therefore, during the sensing of temperatures $T_i$, the current due to temperatures $T_x$ (through sensor 170) is zero. The second analog to digital conversion is performed by converting means 110 on the temperature difference $\Delta T$. A logical one (1) signal is provided at the digital input a of switching device 160 by control element 20 thereby closing switching device 160 and establishing a different reference voltage at the positive (+) input of op amp. 180 from the reference voltage at the positive (+) input of comparator 120.

Referring to FIG. 3, there is shown a flow diagram of the method of our present invention including the analog to digital conversion (A/D conversion) process performed by converting means 110 (See FIG. 2.) When the dryer is started by the user, the control element 20 of control system 10 checks, after each cycle of clock 12, to determine if one (1) minute has elapsed. If one (1) minute has not elapsed, then the control element 20 checks to determine if two (2) seconds have elapsed. If two (2) seconds have not elapsed, the control element 20 begins a repeated check to determine if these time periods have elapsed. However, if two (2) seconds have elapsed, a signal is provided by control element 20 to address means 100 to initiate the $j^{th}$ analog to digital conversions of temperatures $T_i$ and $\Delta T = T_i - T_x$ sensed by sensors 150 and 170. The control element then sums and averages all $j^{th}$ analog to digital conversions accumulated within the $n^{th}$ minute ($t_n$) to provide totals $(T_i)_n$ and $\Delta T_n$ for the $N^{th}$ minute ($t_n$) (See FIG. 4 for graphical representation). If a one (1) minute interval has elapsed, the accumulated data $(T_i)_n$ and $\Delta T_n$ for that $n^{th}$ one (1) minute interval ($t_n$) is checked against previously acquired temperature data by control element 20. First, control element 20 checks to determine if the latest accumulated data ($n^{th}$ version) is greater than or equal to the previously stored peak value of $\Delta T$ ($\Delta T_{pk}$) i.e. $\Delta T_n \geq \Delta T_{pk}$. As previously indicated, the peak value of $\Delta T$ will vary greatly depending upon the size of the load being dried. Accordingly, by this method, control system 10 determines the peak value of $\Delta T$ for each drying operation as a starting point for subsequently determining the amount of change in $\Delta T$, i.e. $\Delta\Delta T$ or the final value of $\Delta T$ at a time $t_f$ i.e. $\Delta T_f$ indicative of a desired dryness level of the load. If $\Delta T$ is greater than or equal to the previously stored peak value of $\Delta T$ then the $n^{th}$ version of $\Delta T$ ($\Delta T_n$) is considered to be the new peak value of $\Delta T$ ($\Delta T_{pk}$). For each new peak value of $\Delta T$ ($\Delta T_{pk}$) a calculation of the final value of $\Delta T$ ($\Delta T_f$) is made by control element 20 utilizing an equation wherein $\Delta T_f$ is a function of the new peak value of $\Delta T$ ($\Delta T_{pk}$) and a constant $N_D$ which is determined from the desired dryness level originally programmed by the user. For example, the following equations have been developed for deriving a value for $\Delta T_f$ (temperatures T are in degrees fahrenheit):

$$\Delta T_f = \Delta T_{pk} - (10 + (N_{LS}) - 4(N_D)) \tag{a}$$

where:

| | |
|---|---|
| $N_{LS} = 0$ | Light Load |
| $N_{LS} = 1$ | Medium Load |
| $N_{LS} = 2$ | Heavy Load |
| $N_D = 0$ | Dry |
| $N_D = 1$ | Damp |
| $N_D = 2$ | Very Damp | or $$\Delta T_f = \Delta T_{pk}(1 - 1/N_D) \tag{b}$$

where:

| | |
|---|---|
| $N_D = 3$ | Dry |
| $N_D = 4$ | Damp |
| $N_D = 5$ | Very Damp |

It should be understood that the above two equations are only exemplary of the numerous equations which may be developed to derive a value for $\Delta T_f$ indicative of the desired dryness level. It is only a requirement of our invention that $\Delta T_f$ be derived as a function of $\Delta T_{pk}$ and the constant $N_D$. Furthermore, the constant $N_{LS}$ of equation (a) could be determined from the magnitude of $\Delta T_{pk}$ rather than programmed by the user or as exemplified by equation (b) the magnitude relating to size may be multiplied by a fixed ratio.

Control element 20 continues to store new peak values of $\Delta T$ ($\Delta T_{pk}$) for each one (1) minute interval of clock 12 and derive a new value of $\Delta T_f$ until the $n^{th}$ version of $\Delta T$ ($\Delta T_n$) is less than the previously stored value of $\Delta T_{pk}$, i.e. $\Delta T_n < \Delta T_{pk}$. When $\Delta T_n < \Delta T_{pk}$ the previously determined values for $\Delta T_{pk}$ and $\Delta T_f$ will represent the necessary values for the load being dried. Accordingly, if $\Delta T_n < \Delta T_{pk}$, control element 20 checks to determine if the current value of $\Delta T_n$ is less than the derived value of $\Delta T_f$, i.e. $\Delta T_n < \Delta T_f$. If $\Delta T_n$ (current value) is less than $\Delta T_f$ then the drying operation is complete and the load has been dried to the desired (programmed) dryness level; accordingly, the drying operation is stopped. However, if $\Delta T_n$ is not less than $\Delta T_f$, control element 20 may check to determine if the lint filter is clogged and the next $n^{th}$ version of $\Delta T$ will be compared to $\Delta T_f$.

The temperature in the compartment (not shown) can be controlled either by maintaining temperature $T_i$ or $T_x$ at a predetermined value by utilizing the control element 20 to control power to machine function 82 (heater). Accordingly, two alternative methods are available to determine if the lint filter is clogged depending upon whether temperature $T_i$ or $T_x$ is maintained at a constant value in order to control the air temperature within the compartment. To determine if the lint filter is clogged when $T_x$ is maintained at a constant value, control element 20 performs a check on temperature $T_i$. If $T_i$ has reached a predetermined maximum value, the control element 20 interprets this information as indicative of a clogged lint filter and deactivates the drying apparatus 90. To determine if the lint filter is clogged when $T_i$ is maintained at a constant value control element 20 performs a check on machine function 82 (heater) to determine the power required to maintain temperature $T_i$. When the power level drops below a predetermined minimum value, the control element 20 interprets this information as indicative of a clogged lint filter and deactivates the drying apparatus 90.

In still a further step of our method, once the drying operation has been terminated, the motor (machine function 72) of the drying apparatus 90 may be allowed to run for a predetermined time period with the heater (machine function 82) turned off.

Referring again to FIG. 2, the analog to digital conversion process of converting means 110 will be further described. Initially, control element 20 provides logical zero (0) bits to each of the bit weighing elements 130, 132, 134, 136, and 138. Subsequently, the most significant bit (MSB) of control element 20 is set to logical one (1) which is weighed for example by resistor 130. If the MSB current exceeds the input temperature current of comparator 120, the voltage at the negative (−) input of comparator 120 will exceed the voltage at its positive (+) input. Accordingly, the output voltage of comparator 120 will be logical zero (0) thereby deactivating switching device 124 and causing the voltage transmitted to control element 20 through switching device 140 to be approximately V+ or logical one (1). By processing this logical one (1) input in accordance with its internal program, control element 20 determines that the MSB is unacceptable and therefore the MSB is reset to logical zero (0) and the second most significant bit is set at logical one (1). If the second most significant bit current (e.g. current through resistor 132) is less than the input temperature current to comparator 120, the negative (−) input voltage of comparator 120 will be less than its positive (+) input voltage. Accordingly, the output voltage of comparator 120 will rise to a voltage determined by diode 126 and thereby turn on switching device 124 which will cause the voltage transmitted to control element 20 through switching device 140 to be logical zero (0). By processing this logical zero (0) input in accordance with its internal program, control element 20 determines that the second most significant bit is acceptable. This process is continued until the least significant bit (LSB) has been tried and either accepted or rejected. If a bit is accepted, it is stored by control element 20 in its set state while each lower bit in order is tried as described above.

In the preferred embodiment, control system 10 was designed to measure input temperatures $T_i$ in a range of 126° F. to 222° F. or a range of 96°. Since the analog to digital converter (converting means 110) of our invention has five bits, there are thirty-two (32) possible states of the converter. Accordingly, for a temperature range of 96°, temperatures could be measured in 3° increments. Furthermore, it was determined that the values of temperatures $T_i$ and $\Delta T$ fluctuated between two to four degrees during each one (1) minute time period of operation of the apparatus 90. Accordingly, as previously described, repeated readings of these temperatures were taken every 2 seconds for each entire one (1) minute period of operation and average values for temperatures $T_i$ and $\Delta T$ were accumulated.

In view of the above description it can be seen that the several objects of our invention are achieved and other advantageous results attained and that further modifications can be made, some of which have been described herein without departing from the spirit and scope of an invention as defined in the appended claims.

What we claim is:

1. In a drying apparatus of the type which includes a compartment within which a load is dried, at least one machine function for providing a stream of heated air to said compartment, and means for venting a stream of moisture laden air from said compartment during a drying cycle of said apparatus, the improvement comprising: a programmable system for controlling at least one operation variable of said apparatus, said control system including a control element for processing a plurality of signals indicative of said operation variable in accordance with a control strategy, means for addressing said signals to said control element including at least one sensor thermally responsive to said stream of heated air and at least one sensor thermally responsive to said stream of moisture laden air for sensing a plurality of temperatures of said heated air and said moisture laden air, said control element determines a maximum temperature difference from a plurality of temperature differences between said heated air and said moisture laden air from which a final temperature difference is derived and in response to a decrease in said temperature differences deactivates said machine function when said final temperature difference is achieved, and means responsive to said control element for activating and deactivating said machine function.

2. The improved drying apparatus as recited in claim 1 wherein said control system further includes means for addressing at least one programmed resultant for said operation variable to said control element.

3. The improved drying apparatus as recited in claim 2 wherein said control system further includes a source of continuous equally spaced electrical pulses from which time intervals are derivable by said control element for operation of said apparatus.

4. The improved drying apparatus as recited in claim 3 wherein said operation variable is dryness of said load upon termination of an operation cycle of said drying apparatus.

5. The improved drying apparatus as recited in claim 4 wherein said programmed resultant for said dryness of said load is a desired time period for said operation cycle within which dryness is achieved.

6. The improved drying apparatus as recited in claim 4 wherein said control system controls at least two other operation variables of said drying apparatus by sensing temperatures of said heated air and temperatures of said moisture laden air.

7. The improved drying apparatus as recited in claim 6 wherein said control element in accordance with said control strategy compares said temperatures of said heated air to a temperature value predetermined to be indicative of an undesirable operation condition.

8. The improved drying apparatus as recited in claim 7 wherein said control element in accordance with said control strategy compares said temperatures of said moisture laden air to a predetermined temperature value whereby said machine function is activated and deactivated to maintain a desired temperature within said compartment.

9. The improved drying apparatus as recited in claim 4 wherein said programmed resultant for said dryness of said load is a desired dryness level of said load.

10. The improved drying apparatus as recited in claim 9 wherein said final temperature difference is indicative of said desired dryness level of said load.

11. The improved drying apparatus as recited in claim 10 wherein said control element determines said maximum temperature difference from said plurality of temperature differences between said heated air and said moisture laden air as a function of said load size for each operation cycle of said drying apparatus.

12. The improved drying apparatus as recited in claim 11 wherein said control element in accordance with said control strategy derives said final temperature difference as a function of said maximum temperature difference and said programmed resultant for said operation variable.

13. The improved drying apparatus as recited in claim 12 wherein said means for addressing said signals to said control element further includes means for converting said temperatures sensed by said sensors to functional signals.

14. A control system for controlling at least two operation modes of a drying apparatus of the type which includes a compartment within which at least one article is dried, at least one machine function for providing a stream of heated air to said compartment, and means for venting a stream of moisture laden air from said compartment during an operation cycle of said apparatus, comprising: means for addressing instructions to said control system including means for programming said apparatus to operate in a time dependent mode and means for programming said apparatus to operate in a condition responsive mode, a control element responsive to said means for addressing instructions to said control system for processing a plurality of signals indicative of a plurality of operation variables of said apparatus in accordance with a control strategy whereby said apparatus is operated in one of said two programmable modes, means for providing a continuous train of equally spaced electrical pulses from which time intervals are derivable by said control element for operation of said apparatus in said time dependent mode, and means for sensing a plurality of temperatures of said heated air and said moisture laden air from which a plurality of temperature differences including a final maximum temperature difference are derivable for operation of said apparatus in said condition responsive mode wherein said machine function is deactivated when said final temperature difference is achieved in response to a decrease in said temperature differences.

15. The control system as recited in claim 14 wherein said means for addressing instructions further includes means for programming resultants for said operation variables of said apparatus.

16. The control system as recited in claim 15 further including means for indicating which mode of operation of said apparatus has been programmed and which resultants of said operation variables have been programmed to be achieved during said operation and means for signalling events accomplished by said apparatus during said operation cycle.

17. The control system as recited in claim 16 further including means for interrupting said operation of said apparatus when desired.

18. A method of controlling the operation of a drying apparatus of the type which includes a compartment within which a load is dried, at least one machine function for providing a stream of heated air to said compartment and means for venting a stream of moisture laden air from said compartment during a drying cycle of said apparatus, comprising the steps of: programming a desired dryness level for said article to be achieved by said apparatus, sensing a plurality of temperatures of said heated air as it enters said compartment, sensing a plurality of temperatures of said moisture laden air as it leaves said compartment, determining a maximum temperature difference between said temperatures of said heated air and said temperatures of said moisture laden air during each drying cycle of said apparatus, deriving as a function of said maximum temperature difference and said programmed dryness level for said load a final temperature difference between said temperatures which is less than said maximum temperature difference and is indicative of said programmed dryness level, and deactivating said machine function when said final temperature difference is determined to substantially exist.

19. The method as recited in claim 18 further including the step of periodically determining a temperature difference between said temperatures of said heated air and said temperatures of said moisture laden air from which said maximum temperature difference is determined.

20. The method as recited in claim 19 wherein said maximum temperature difference is determined as a function of said load size.

21. The method as recited in claim 20 further including the step of comparing each periodically determined temperature difference to a highest previously determined temperature difference whereby said maximum temperature difference is determined.

22. The method as recited in claim 21 further including the step of comparing each periodically determined temperature difference which is less than said maximum temperature difference to said final temperature difference.

23. The method as recited in claim 22 wherein said machine function is deactivated when a periodically determined temperature difference substantially equals said final temperature difference.

24. The method as recited in claim 23 further including the step of deactivating said machine function when a temperature of said heated air is sensed which substantially equals a predetermined temperature value.

25. The method as recited in claim 23 further including the step of deactivating said machine function when a temperature of said moisture ladened air is sensed which substantially equals another predetermined temperature value.

26. A method of controlling the operation of an appliance and the like comprising the steps of: programming at least one resultant to be achieved by said appliance operation, sensing at least two physical variables associated with said appliance operation, periodically determining a difference between said variables, determining a maximum difference between said variables during each cycle of operation of said appliance, deriving as a function of said maximum difference between said variables and said programmed resultant to be achieved by said appliance operation a final difference between said variables which is less than said maximum temperature difference and is indicative of said programmed resultant, and terminating said appliance operation when a periodically determined difference between said variables substantially equals said derived final difference between said variables.

27. The method as recited in claim 26 further including the step of comparing each periodically determined difference between said variables to a highest previously determined difference between said variables whereby said maximum difference between said variables is determined.

28. The method as recited in claim 27 further including the step of comparing each periodically determined difference between said variables which is less than said maximum difference between said variables to said final difference between said variables.

29. The method as recited in claim 28 further including the step of deactivating at least one function of said appliance operation when a value of one of said variables is sensed which substantially equals a predetermined value.

30. The method as recited in claim 29 further including the step of deactivating at least one function of said appliance operation when a value of another of said variables is sensed which substantially equals another predetermined value.

31. In a drying apparatus of the type which includes a compartment within which a load is dried, at least one machine function for providing a stream of heated air to said compartment, and means for venting a stream of moisture ladened air from said compartment during a drying cycle of said apparatus, the improvement comprising: a programmable system for controlling at least three operation variables of said apparatus a first of which is dryness of said load upon termination of an operation cycle of said drying apparatus, said control system including a control element for processing a plurality of signals indicative of said operation variables in accordance with a control strategy, means for addressing said signals to said control elements, said means for addressing said control element including at least one sensor thermally responsive to said stream of heated air and at least one sensor thermally responsive to said stream of moisture laden air whereby a plurality of temperatures are sensed and at least one final temperature difference between said heated air and said moisture laden air is determined having a value derived by said control element for activating and deactivating said machine function in accordance with said control strategy, a means for addressing at least one programmed resultant for said dryness of said load to said control element, and a source of continuous pulses from which time intervals are derivable by said control element for operation of said apparatus.

32. The drying apparatus as recited in claim 31 wherein said control element in accordance with said control strategy compares said temperatures of said heated air to a temperature value predetermined to be indicative of an undesirable operation condition of a second operation variable.

33. The drying apparatus as recited in claim 32 wherein said control element in accordance with said control strategy compares said temperatures of said moisture laden air to another predetermined temperature value to control a third operation variable.

34. The drying apparatus as recited in claim 33 wherein the third operation variable is a temperature within said compartment and said machine function is activated and deactivated to maintain a desired temperature within said compartment.

* * * * *